(12) United States Patent
Chang et al.

(10) Patent No.: US 11,623,987 B2
(45) Date of Patent: Apr. 11, 2023

(54) POLYCARBONATE RESIN COMPOSITION HAVING EXCELLENT LIGHT-REFLECTING AND LIGHT-SHIELDING PROPERTIES, AND AUTOMOTIVE MOLDED ARTICLE PRODUCED USING THE SAME

(71) Applicants: HYUNDAI MOBIS CO., LTD., Seoul (KR); LG CHEM, LTD., Seoul (KR)

(72) Inventors: Jae Joon Chang, Yongin-si (KR); Myeung Il Kim, Daejeon (KR); Jae Hwan Kim, Daejeon (KR); Jin Sol Park, Daejeon (KR); Soo Min Lee, Daejeon (KR)

(73) Assignees: HYUNDAI MOBIS CO., LTD., Seoul (KR); LG CHEM, LTD., Seoul (KR)

(*) Notice: Subject to any disclaimer, the term of this patent is extended or adjusted under 35 U.S.C. 154(b) by 287 days.

(21) Appl. No.: 16/984,802

(22) Filed: Aug. 4, 2020

(65) Prior Publication Data
US 2021/0040313 A1    Feb. 11, 2021

(30) Foreign Application Priority Data
Aug. 6, 2019   (KR) .................. 10-2019-0095374

(51) Int. Cl.
| | | |
|---|---|---|
| *C08L 69/00* | (2006.01) | |
| *C08L 55/02* | (2006.01) | |
| *C08L 25/12* | (2006.01) | |
| *C08K 3/22* | (2006.01) | |
| *C08K 3/34* | (2006.01) | |

(52) U.S. Cl.
CPC ............... *C08L 69/00* (2013.01); *C08K 3/22* (2013.01); *C08K 3/34* (2013.01); *C08L 25/12* (2013.01); *C08L 55/02* (2013.01); *C08K 2003/2241* (2013.01); *C08K 2201/003* (2013.01); *C08K 2201/005* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 6,133,360 A | 10/2000 | Barren et al. | |
| 6,531,534 B1* | 3/2003 | Katayama | ............... C08L 69/00 |
| | | | 524/451 |
| 2002/0115762 A1* | 8/2002 | Chung | ................... C08L 69/00 |
| | | | 524/161 |
| 2011/0269882 A1* | 11/2011 | Kurokawa | .............. C08L 69/00 |
| | | | 524/161 |

FOREIGN PATENT DOCUMENTS

| | | | |
|---|---|---|---|
| CN | 1255428 A | | 6/2000 |
| CN | 101316894 A | | 12/2008 |
| CN | 103665816 | * | 3/2014 |
| EP | 2115064 B1 | | 4/2016 |
| JP | 08012869 | * | 1/1996 |
| KR | 10-2008-0061310 A | | 7/2008 |

OTHER PUBLICATIONS

Ishihara Sangyo Kaisha LTD, New Tipaque News vol. 1; Titanium Dioxide Pigments (2005) pp. 1-43. (Year: 2005).*

* cited by examiner

*Primary Examiner* — David J Buttner
(74) *Attorney, Agent, or Firm* — NovoTechIP International PLLC

(57) ABSTRACT

The present disclosure relates to a polycarbonate resin composition having excellent light-reflecting and light-shielding properties, and an automotive molded article produced using the same. The polycarbonate resin composition includes: 60 to 70 wt % of a polycarbonate resin; 4 to 10 wt % of a rubber-modified vinyl-based graft copolymer; 3 to 11 wt % of a styrene-based copolymer; 15 to 25 wt % of titanium dioxide; and 2 to 3 wt % of a mineral filler.

14 Claims, No Drawings

POLYCARBONATE RESIN COMPOSITION HAVING EXCELLENT LIGHT-REFLECTING AND LIGHT-SHIELDING PROPERTIES, AND AUTOMOTIVE MOLDED ARTICLE PRODUCED USING THE SAME

CROSS-REFERENCE TO RELATED APPLICATION

This application claims priority from and the benefit of Korean Patent Application No. 10-2019-0095374, filed on Aug. 6, 2019, which is hereby incorporated by reference for all purposes as if set forth herein.

BACKGROUND

Field

Exemplary embodiments of the present disclosure relate to a polycarbonate resin composition having excellent light-reflecting and light-shielding properties, and an automotive molded article produced using the same.

Discussion of the Background

In-vehicle infotainment (IVI) devices that control the function of providing information, such as an in-vehicle state and navigation, and entertainment functions, such as music and video playback, have attracted attention. In recent years, with the popularization of smart phones and tablet PCs and the development of information technology (IT), more various infotainment services have become possible through the combination of functions, such as in-vehicle navigation, audio/video output and Internet, with personal IT devices. These IVI devices (products) include audio-video navigation (AVN), integrated center stack (ICS), and the like.

In recent years, the production of IVI devices with a dead-front design has been expanded, and in response to this expansion, a gray-colored material has been required for a button housing of the IVI device. However, when the gray-colored material is applied, a problem arises in that the light transmittance is reduced, and hence the luminance of the button is reduced. Therefore, there is a need to improve the luminance of the material for the button housing.

The background art related to the present disclosure is disclosed in Korean Patent Application Laid-Open No. 2008-0061310 (published on Jul. 2, 2008; entitled "Polycarbonate Resin Composition Having Excellent Yellowing Resistance and Flame retardancy).

SUMMARY

An object of the present disclosure is to a polycarbonate resin composition having excellent light-reflecting and light-shielding properties.

Another object of the present disclosure is to provide a polycarbonate resin composition having excellent appearance, heat resistance, impact resistance and mechanical strength.

Still another object of the present disclosure is to provide a polycarbonate resin composition having excellent processability, moldability and dimensional stability.

Yet another object of the present disclosure is to provide an automotive molded article produced using the polycarbonate resin composition.

One aspect of the present disclosure is directed to a polycarbonate resin composition. In one embodiment, the polycarbonate resin composition includes: 60 to 70 wt % of a polycarbonate resin; 4 to 10 wt % of a rubber-modified vinyl-based graft copolymer; 3 to 11 wt % of a styrene-based copolymer; 15 to 25 wt % of titanium dioxide; and 2 to 3 wt % of a mineral filler.

In one embodiment, the polycarbonate resin may have a melt index of 2 to 30 g/10 min, as measured in accordance with the standard ASTM D 1238 (at 300° C. under 1.2 kgf), and a weight-average molecular weight of 20,000 to 80,000 g/mol.

In one embodiment, the rubber-modified vinyl-based graft copolymer may have a structure including: a rubbery polymer core; and a shell formed by graft-polymerizing an aromatic vinyl-based monomer and a vinyl cyanide-based monomer to the core.

In one embodiment, the styrene-based copolymer may include a copolymer of a styrene-based monomer and a vinyl cyanide-based monomer.

In one embodiment, the rubber-modified vinyl-based graft copolymer and the styrene-based copolymer may be included at a weight ratio of 1:1 to 1:2.

In one embodiment, the sum of the rubber-modified vinyl-based graft copolymer and the styrene-based copolymer and the titanium dioxide may be included at a weight ratio of 1:1 to 1:3.

In one embodiment, the titanium dioxide may have an average size of 0.1 to 0.3 μm and a rutile phase.

In one embodiment, the titanium dioxide may be surface-treated.

In one embodiment, the mineral filler may include one or more of talc, mica and wollastonite.

In one embodiment, the talc may have an average size of 3 to 10 μm, and the wollastonite may have an average size of 5 to 30 μm.

In one embodiment, the polycarbonate resin composition may further include an additive in an amount of 0.01 to 5 wt % based on the total weight of the composition, and the additive may include one or more of a thermal stabilizer, a lubricant and a light stabilizer.

In one embodiment, the polycarbonate resin composition may have a light reflectance of 95% or more at a wavelength of 400 to 700 nm, and a light transmittance of 0% at a wavelength of 400 to 700 nm.

In one embodiment, the polycarbonate resin composition may have a melt index of 10 to 16 g/10 min, as measured in accordance with the standard ISO 1133 (at 260° C. under 5 kg), a notched impact strength of 34 kJ/m$^2$ or more at room temperature (23° C.), as measured in accordance with the standard ISO 179, and a heat distortion temperature (HDT) of 105° C. or higher as measured in accordance with the standard ISO 75.

Another aspect of the present disclosure is directed to an automotive molded article produced using the polycarbonate resin composition. In one embodiment, the automotive molded article may be a button housing, a button holder, an inner panel, or a multi-terminal housing.

The polycarbonate resin composition according to the present disclosure and the molded article produced using the same may completely shield light due to its excellent light-reflecting and light-shielding properties, and may have excellent appearance, heat resistance, impact resistance and mechanical strength, and may also have excellent processability, moldability and dimensional stability.

DETAILED DESCRIPTION OF THE ILLUSTRATED EMBODIMENTS

In the following description, the detailed description of related known technology or configuration will be omitted when it may unnecessarily obscure the subject matter of the present disclosure.

In addition, the terms used in the following description are terms defined taking into consideration the functions obtained in accordance with embodiments of the present disclosure, and may be changed in accordance with the option of a user or operator or a practice. Accordingly, the definition of the terms should be made based on the contents throughout the present specification.

Polycarbonate Resin Composition

One aspect of the present disclosure is directed to a polycarbonate resin composition. In one embodiment, the polycarbonate resin composition includes: a polycarbonate resin; a rubber-modified vinyl-based graft copolymer; a styrene-based copolymer; titanium dioxide; and a mineral filler.

Hereinafter, the components of the composition will be described in detail.

(A) Polycarbonate Resin

The polycarbonate resin may be produced by copolymerizing a bisphenol-based monomer and a carbonate precursor.

For example, the bisphenol-based monomer may be one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

For example, the carbonate precursor may be one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride (phosgene), triphosgene, diphosgene, carbonyl bromide, and bishaloformate.

In one embodiment, the polycarbonate resin may have a melt index of 2 to 30 g/10 min, as measured in accordance with the standard ASTM D 1238 (at 300° C. under 1.2 kgf). Under this condition, the composition may have excellent processability and compatibility. For example, the melt index may be 5 to 25 g/10 min. For example, the melt index may be 2, 3, 4, 5, 6, 7, 8, 9, 10, 11, 12, 13, 14, 15, 16, 17, 18, 19, 20, 21, 22, 23, 24, 25, 26, 27, 28, 29 or 30 g/10 min.

In one embodiment, the polycarbonate resin may have a weight-average molecular weight of 20,000 to 80,000 g/mol. Under this condition, the composition may have excellent mechanical properties such as miscibility and impact resistance.

In one embodiment, the polycarbonate resin is included in an amount of 60 to 70 wt % based on the total weight of the polycarbonate resin composition. If the polycarbonate resin is included in an amount of less than 60 wt %, the appearance, impact resistance and heat resistance of the composition may be degraded, and if the polycarbonate resin is included in an amount of more than 70 wt %, the light-reflecting or light-shielding property of the composition may be degraded. For example, the polycarbonate resin may be included in an amount of 63 to 67 wt %. For example, the polycarbonate resin may be included in an amount of 60, 61, 62, 63, 64, 65, 66, 67, 68, 69 or 70 wt % based on the total weight of the polycarbonate resin composition.

(B) Rubber-Modified Vinyl-Based Graft Copolymer

The rubber-modified vinyl-based graft copolymer may have a structure in which an aromatic vinyl-based monomer and a monomer copolymerizable with the aromatic vinyl-based monomer are graft-polymerized to a rubbery polymer.

For example, the rubber-modified vinyl-based graft copolymer may be obtained by adding an aromatic vinyl-based monomer, a monomer copolymerizable with the aromatic vinyl-based monomer, etc. to a rubbery polymer, and then polymerizing these monomers. For example, the rubber-modified vinyl-based graft copolymer may further include a monomer for imparting processability and heat resistance, if necessary. The polymerization may be performed by a publicly-known polymerization method, such as emulsion polymerization, suspension polymerization, bulk polymerization, or the like.

In one embodiment, examples of the rubbery polymer include diene-based rubber, such as polybutadiene, poly(styrene-butadiene) and poly(acrylonitrile-butadiene); saturated rubber obtained by adding hydrogen to the diene-based rubber; acrylic rubber, such as isoprene rubber and polybutyl acrylate; and an ethylene-propylene-diene monomer terpolymer (EPDM). These polymers may be used alone or as a mixture of two or more. For example, diene-based rubber may be used, and particularly, polybutadiene rubber may be used. The content of the rubbery polymer may be 5 to 65 wt %, for example, 10 to 60 wt %, based on 100 wt % of the rubber-modified vinyl-based graft copolymer. Within this content range, the polycarbonate resin composition including the rubber-modified vinyl-based graft copolymer may have excellent mechanical properties such as impact resistance, heat resistance, flowability, and the like.

In one embodiment, the average particle size (Z-average) of the rubbery polymer (rubber particles) may be 0.05 to 6 μm, for example, 0.15 to 4 μm. Within this range, the polycarbonate resin composition may have excellent mechanical properties such as impact resistance, heat resistance, flowability, and the like.

In one embodiment, the rubbery polymer may be obtained by swelling and polymerization of an aromatic vinyl-based monomer and a vinyl cyanide-based monomer in the rubbery polymer. For example, the rubbery polymer that is used in the present disclosure may be produced by adding a mixture of an aromatic vinyl-based monomer, a vinyl cyanide-based monomer and a polymerization initiator to the rubber polymer, adding an emulsifier, a molecular weight-controlling agent and water thereto, stirring the mixture such that the aromatic vinyl-based monomer and the vinyl cyanide-based monomer are swollen into the rubbery polymer, and then polymerizing these monomers. The method of producing this rubbery polymer is known in the art and may be easily performed by those skilled in the art.

In one embodiment, the aromatic vinyl-based monomer is a monomer that may be graft-copolymerized to the rubbery copolymer, and examples thereof include, but are not limited to, styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like. These monomers may be used alone or as a mixture of two or more. The content of the aromatic vinyl-based monomer may be 15 to 95 wt %, for example, 20 to 80 wt %, based on 100 wt % of the rubber-modified vinyl-based graft copolymer. Within this content range, the polycarbonate resin composition may have excellent mechanical properties such as impact resistance, heat resistance, flowability, and the like.

In one embodiment, examples of the monomer copolymerizable with the aromatic vinyl-based monomer include vinyl cyanide-based monomers such as acrylonitrile, methacrylonitrile, ethacrylonitrile, phenylacrylonitrile, α-chloroacrylonitrile and fumaronitrile. These monomers may be used alone or as a mixture of two or more. Particularly, acrylonitrile and methacrylonitrile may be used. The content of the monomer copolymerizable with the aromatic vinyl-based monomer may be 1 to 50 wt %, for example, 5 to 45 wt %, based on 100 wt % of the rubber-modified vinyl-based graft copolymer. Within this content range, the polycarbonate resin composition may have excellent mechanical properties such as impact resistance, heat resistance, flowability, and the like.

In one embodiment, examples of the monomer for imparting processability and heat resistance include, but are not limited to, acrylic acid, methacrylic acid, alkyl acrylate, alkyl methacrylate, maleic anhydride, maleimide-based compounds (N-substituted maleimide), and mixtures thereof. The content of the monomer for imparting processability and heat resistance may be 15 wt % or less, for example, 10 wt % or less, based on 100 wt % of the rubber-modified vinyl-based graft copolymer. Within this content range, the monomer may improve the processability and heat resistance of the rubber-modified vinyl-based graft copolymer without degrading other physical properties.

In one embodiment, the rubber-modified vinyl-based graft copolymer may have a structure including: a rubbery polymer core; and a shell formed by graft-polymerizing an aromatic vinyl-based monomer and a vinyl cyanide-based monomer to the core.

In one embodiment, the rubber-modified vinyl-based graft copolymer may include a copolymer (g-ABS) including: a polybutadiene rubbery polymer core; and a shell formed by graft-polymerizing the aromatic vinyl-based monomer styrene and the vinyl cyanide-based monomer acrylonitrile to the core.

In one embodiment, the rubber-modified vinyl-based graft copolymer is included in an amount of 4 to 10 wt % based on the total weight of the polycarbonate resin composition. If the rubber-modified vinyl-based graft copolymer is included in an amount of less than 4 wt %, the impact resistance and light-reflecting and light-shielding properties of the resin composition according to the present disclosure may be reduced, and if the rubber-modified vinyl-based graft copolymer is included in an amount of more than 10 wt %, the melt index of the resin composition may be reduced, and thus the miscibility, moldability or mechanical properties thereof may be degraded. For example, the rubber-modified vinyl-based graft copolymer may be included in an amount of 5 to 8 wt %. For example, the rubber-modified vinyl-based graft copolymer may be included in an amount of 4, 5, 6, 7, 8, 9 or 10 wt % based on the total weight of the polycarbonate resin composition.

(C) Styrene-Based Copolymer

The styrene-based copolymer may include a copolymer of a styrene-based monomer and a vinyl cyanide-based monomer.

In one embodiment, the styrene-based monomer that is used in the present disclosure may be selected from the group consisting of styrene; divinylbenzene; vinyl toluene; alkyl-substituted styrenes, such as α-methylstyrene, p-t-butylstyrene, and 2,4-dimethylstyrene; halogen-substituted styrenes; and combinations thereof, in which the alkyl means a C1 to C8 alkyl.

In one embodiment, the vinyl cyanide-based monomer may be acrylonitrile, methacrylonitrile, fumaronitrile, or a combination of two or more thereof, but is not limited thereto.

In one embodiment, the copolymer of the styrene-based monomer and the vinyl cyanide-based monomer may be produced by emulsion polymerization, suspension polymerization, solution polymerization, bulk polymerization, or the like.

In one embodiment, the copolymer of the styrene-based monomer and the vinyl cyanide-based monomer may include, based on 100 wt % of the copolymer, 10 wt % to 40 wt % of the vinyl cyanide-based monomer and 60 wt % to 90 wt % of the styrene-based monomer.

When the content of each of the vinyl cyanide-based monomer and the styrene-based monomer satisfies the above-described range, the polycarbonate resin composition including the copolymer of these monomers may exhibit excellent physical properties, such as impact resistance, flowability, heat resistance and hardness.

In one embodiment, the weight-average molecular weight of the styrene-based copolymer may be 40,000 g/mol to 500,000 g/mol. Within this range, the polycarbonate resin composition of the present disclosure may have excellent mechanical properties.

In one embodiment, the styrene-based copolymer is included in an amount of 3 to 11 wt % based on the total weight of the polycarbonate resin composition. If the styrene-based copolymer is included in an amount of less than 3 wt %, the melt index of the resin composition may be reduced, and thus the moldability thereof may be degraded, and if the styrene-based copolymer is included in an amount of more than 11 wt %, the miscibility of the resin composition may be degraded, or the mechanical properties thereof such as impact resistance may be degraded. For example, the styrene-based copolymer may be included in an amount of 6 to 9 wt %. In one embodiment, the styrene-based copolymer may be included in an amount of 3, 4, 5, 6, 7, 8, 9, 10 or 11 wt % based on the total weight of the polycarbonate resin composition.

In one embodiment, the rubber-modified vinyl-based graft copolymer and the styrene-based copolymer may be included at a weight ratio of 1:1 to 1:2. Under this weight ratio condition, the miscibility, compatibility, and mechanical properties of the resin composition may all be excellent. For example, the rubber-modified vinyl-based graft copolymer and the styrene-based copolymer may be included at a weight ratio of 1.1 to 1.5.

(D) Titanium Dioxide

The titanium dioxide is included for the purpose of imparting light-reflecting and light-shielding properties to the resin composition.

The titanium dioxide that is used in the present disclosure may be spherical, elliptical, plate-like or amorphous titanium dioxide, but is not limited thereto. In one embodiment, the titanium dioxide ($TiO_2$) may have an average size of 0.1 to 0.3 μm. Here, the term "size" may mean the diameter or maximum length of the titanium dioxide. Within this average size range, the miscibility and dispersibility of the resin composition may be excellent.

In one embodiment, the titanium dioxide may have a rutile phase. In this case, the titanium dioxide may have excellent thermal stability and weather resistance.

In one embodiment, the titanium dioxide may be surface-treated. For example, the surface of the titanium dioxide may be coated and treated with a surface-treating agent. The surface-treating agent may include one or more of an inorganic surface-treating agent and an organic surface-treating agent.

In one embodiment, the inorganic surface-treating agent may include one or more of aluminum oxide ($Al_2O_3$), silicon dioxide ($SiO_2$), zirconia ($ZrO_2$), sodium silicate, sodium aluminate, sodium aluminum silicate, zinc oxide, and mica.

In one embodiment, the organic surface-treating agent may include one or more of polydimethylsiloxane, trimethylpropane, and pentaerythritol. For example, the surface treatment may be performed by coating 100 parts by weight of the titanium dioxide with 0.01 to 10 parts by weight of the surface-treating agent.

In one embodiment, the titanium dioxide is included in an amount of 15 to 25 wt % based on the total weight of the polycarbonate resin composition. If the titanium dioxide is included in an amount of less than 15 wt %, the light-reflecting and light-shielding properties of the resin composition may be degraded, and if the titanium dioxide is included in an amount of more than 25 wt %, the mechanical properties of the resin composition of the present disclosure such as impact strength may be degraded. For example, the titanium dioxide may be included in an amount of 18 to 22 wt %. For example, the titanium dioxide may be included in an amount of 15, 16, 17, 18, 19, 20, 21, 22, 23, 24 or 25 wt % based on the total weight of the polycarbonate resin composition.

In one embodiment, the sum of the rubber-modified vinyl-based graft copolymer and the styrene-based copolymer and the titanium dioxide may be included at a weight ratio of 1:1 to 1:3. Under this weight ratio condition, the resin composition may have excellent light-reflecting and light-shielding properties and mechanical properties such as impact strength while having excellent miscibility. For example, they may be included at a weight ratio of 1:1 to 1:1.6. For example, the sum of the rubber-modified vinyl-based graft copolymer and the styrene-based copolymer and the titanium dioxide may be included at a weight ratio of 1:1 to 1:1.5.

(E) Mineral Filler

The mineral filler is included for the purpose of ensuring a complete light-shielding property without significantly reducing impact resistance. In one embodiment, the mineral filler may include one or more of talc, mica, and wollastonite.

The mineral filler that is used in the present disclosure may be a spherical, elliptical, plate-like or amorphous mineral filler, but is not limited thereto.

In one embodiment, the talc may have an average size of 3 to 10 μm, and the wollastonite may have an average size of 5 to 30 μm. Here, the term "size" may mean the diameter or maximum length of the talc or wollastonite. Under this condition, the resin composition of the present disclosure may have excellent miscibility, dispersibility and heat resistance.

In one embodiment, the mineral filler is included in an amount of 2 to 3 wt % based on the total weight of the polycarbonate resin composition. If the mineral filler is included in an amount of less than 2 wt %, it may be difficult to ensure a complete light-shielding property, and if the mineral filler is included in an amount of more than 3 wt %, the impact resistance of the resin composition may rather be reduced. The mineral filler may be included in an amount of 2, 2.1, 2.2, 2.3, 2.4, 2.5, 2.6, 2.7, 2.8, 2.9 or 3 wt % based on the total weight of the polycarbonate resin composition.

(F) Additive

In one embodiment, the polycarbonate resin composition may further include an additive in an amount of 0.01 to 5 wt % based on the total weight of the composition. The additive may include one or more of a thermal stabilizer, a lubricant and a light stabilizer, but is not limited thereto. For example, the additive may be included in an amount of 0.01, 0.05, 0.1, 0.5, 1, 2, 3, 4 or 5 wt % based on the total weight of the polycarbonate resin composition.

In one embodiment, the polycarbonate resin composition may have a light reflectance of 95% or more at a wavelength of 400 to 700 nm. In addition, the polycarbonate resin composition may have a light transmittance of 0% (or a light-shielding rate of 100%) at a wavelength of 400 to 700 nm. For example, the polycarbonate resin composition may have a light reflectance of 95 to 99.99% at a wavelength of 400 to 700 nm.

The light reflectance (%) and the light transmittance (%) were measured using a measurement device (manufactured by HUNTER LAB; Model: ColorQUEST XE) in RSIN mode. In addition, the light reflectance and the light transmittance may be measured using the SCI measurement method.

In one embodiment, the polycarbonate resin composition may have a melt index of 10 to 16 g/10 min, as measured in accordance with the standard ISO 1133 (at 260° C. under 5 kg), a notched impact strength of 34 kJ/m² or more at room temperature (23° C.), as measured in accordance with the standard ISO 179, and a heat distortion temperature (HDT) of 105° C. or higher as measured in accordance with the standard ISO 75.

For example, the polycarbonate resin composition may have a notched impact strength of 34 to 40 kJ/m² at room temperature (23° C.), as measured in accordance with the standard ISO 179, and a heat distortion temperature (HDT) of 105 to 115° C. as measured in accordance with the standard ISO 75.

Automotive Molded Article Produced Using Polycarbonate Resin Composition

Another aspect of the present disclosure is directed to an automotive molded article produced using the polycarbonate resin composition.

In one embodiment, the automotive molded article may be used for in-vehicle infotainment (IVI) applications. For example, the automotive molded article may be a button housing, a button holder, an inner panel or a multi-terminal housing for audio-video navigation (AVN) and integrated center stack (ICS).

The polycarbonate resin composition according to the present disclosure and the molded article produced using the same may completely shield light due to its excellent light-reflecting and light-shielding properties, and may have excellent appearance, heat resistance, impact resistance and mechanical strength, and may also have excellent processability, moldability and dimensional stability.

Hereinafter, the configuration and effect of the present disclosure will be described in more detail with reference to preferred examples. However, these examples are presented as preferred examples of the present disclosure and shall not be construed as limiting the scope of the present disclosure in any way. The contents that are not described herein can be sufficiently and technically envisioned by those skilled in the art, and thus the description thereof will be omitted herein.

Examples and Comparative Examples

The components used in Examples and Comparative Examples are as follows.

(A) Polycarbonate resin: a polycarbonate resin (LG Chem Ltd., PC 1300-15) having a melt index of 15 g/10 min (measured according to ASTM D1238 at 300° C. under a load of 1.2 Kgf) was used.

(B) Rubber-modified vinyl-based graft copolymer: an acrylonitrile-butadiene-styrene graft copolymer (LG Chem Ltd., DP270E) was used.

(C) Styrene-based copolymer: a copolymer of a styrene-based monomer and a vinyl cyanide-based monomer (SAN, LG Chem Ltd., 80HF) was used.

(D) Titanium dioxide: rutile phase $TiO_2$ having an average diameter of 0.1 to 0.3 μm was used.

(E) Inorganic filler: (E1) talc having an average diameter of 3 to 10 μm was used. (E2) wollastonite having an average diameter of 5 to 30 μm was used.

(F) Additive: a thermal stabilizer, a lubricant or a light stabilizer was used.

Examples 1 to 4 and Comparative Examples 1 to 9

According to the compositions shown in Table 1 below, mixtures were prepared by mixing components together using a known method. Each of the mixtures was placed in a twin-screw extruder (L/D=29, Φ=45 mm), melted, kneaded, and then extruded, thereby preparing pellet-type polycarbonate resin compositions. The prepared pellets were dried at 80° C. for 2 hours, and then injection-molded using an injection molding machine set to a cylinder temperature of 180 to 220° C. and a mold temperature of 60° C., thereby preparing specimens.

Evaluation of Physical Properties

The physical properties of the specimens of Examples 1 to 4 and Comparative Examples 1 to 9 were evaluated as follows, and the results of the evaluation are shown in Table 2 below.

(1) Melt index (g/10 min) was measured in accordance with the standard ISO 1133 (at 260° C. under 5 kg).

(2) Room temperature impact strength ($kJ/m^2$): notched impact strength at room temperature (23° C.) was measured in accordance with the standard ISO 179.

(3) Thermal distortion temperature (HDT, ° C.) was measured in accordance with the standard ISO 75.

(4) Light reflectance (%) and light transmittance (%) were measured using a measurement device (manufactured by HUNTER LAB, Model: ColorQUEST XE) in RSIN mode. The light reflectance and the light transmittance were measured using the SCI measurement method.

TABLE 1

| Components | Examples | | | | Comparative Examples | | | | | | | | |
|---|---|---|---|---|---|---|---|---|---|---|---|---|---|
| (wt %) | 1 | 2 | 3 | 4 | 1 | 2 | 3 | 4 | 5 | 6 | 7 | 8 | 9 |
| (A) | 64 | 64.5 | 64 | 64.5 | 57 | 72 | 64 | 64 | 71 | 54 | 64.5 | 62 | 66 |
| (B) | 6 | 6 | 6 | 6 | 6 | 5 | 2 | 11 | 6 | 6 | 6 | 6 | 6 |
| (C) | 7 | 7 | 7 | 7 | 14 | — | 11 | 2 | 7 | 7 | 7 | 7 | 7 |
| (D) | 20 | 19 | 19 | 19 | 20 | 20 | 20 | 20 | 13 | 30 | 20 | 20 | 20 |
| (E1) | 2 | 2.5 | 3 | — | 2 | 2 | 2 | 2 | 2 | 2 | 1.5 | 4 | — |
| (E2) | — | — | — | 2.5 | — | — | — | — | — | — | — | — | — |
| (F) | 1 | 1 | 1 | 1 | 1 | 1 | 1 | 1 | 1 | 1 | 1 | 1 | 1 |

TABLE 2

| Physical | Examples | | | | Comparative Examples | | | | | | | | |
|---|---|---|---|---|---|---|---|---|---|---|---|---|---|
| properties | 1 | 2 | 3 | 4 | 1 | 2 | 3 | 4 | 5 | 6 | 7 | 8 | 9 |
| Melt index (g/10 min) | 14 | 15 | 14 | 15 | 17 | 10 | 18 | 8 | 16 | 11 | 14 | 13 | 16 |
| Impact strength (23° C., $kJ/m^2$) | 35 | 37 | 34 | 39 | 29 | 40 | 28 | 44 | 38 | 25 | 35 | 30 | 38 |
| HDT (° C.) | 108 | 108 | 109 | 109 | 105 | 111 | 111 | 105 | 109 | 106 | 108 | 109 | 108 |
| Light reflectance % (1 mm) | 96 | 95 | 95 | 95 | 96 | 93 | 94 | 96 | 90 | 97 | 95 | 96 | 94 |
| Light transmittance % (1 mm) | 0 | 0 | 0 | 0 | 0 | 0.2 | 0.1 | 0 | 0.5 | 0 | 0.1 | 0 | 0.3 |

Referring to the results in Table 2 above, it could be seen that Examples 1 to 4 according to the present disclosure had a light reflectance of 95% or more and a light transmittance of 0%, indicating that they can completely shield light. However, it could be seen that Comparative Examples 1 to 9 that do not satisfy the conditions of the present disclosure showed inferior miscibility and mechanical properties or inferior light-reflecting and light-shielding properties, compared to Examples 1 to 4.

Simple modifications or variations of the present disclosure may be easily carried out by those skilled in the art, and all such modifications or variations can be considered included in the scope of the present disclosure.

What is claimed is:

1. A polycarbonate resin composition comprising:
    60 to 70 wt % of a polycarbonate resin;
    4 to 10 wt % of a rubber-modified vinyl-based graft copolymer;
    3 to 11 wt % of a styrene-based copolymer;
    15 to 25 wt % of titanium dioxide; and
    2 to 3 wt % of a mineral filler,
    wherein the rubber-modified vinyl-based graft copolymer has a structure comprising:
        a rubbery polymer core; and
        a shell formed by graft-polymerizing an aromatic vinyl-based monomer and a vinyl cyanide-based monomer to the core.

2. The polycarbonate resin composition of claim 1, wherein the polycarbonate resin has a melt index of 2 to 30 g/10 min, as measured in accordance with standard ASTM D 1238 (at 300° C. under 1.2 kgf), and a weight-average molecular weight of 20,000 to 80,000 g/mol.

3. The polycarbonate resin composition of claim 1, wherein the styrene-based copolymer comprises a copolymer of a styrene-based monomer and a vinyl cyanide-based monomer.

4. The polycarbonate resin composition of claim 1, wherein the rubber-modified vinyl-based graft copolymer and the styrene-based copolymer are comprised at a weight ratio of 1:1 to 1:2.

5. The polycarbonate resin composition of claim 1, wherein the sum of the rubber-modified vinyl-based graft copolymer and the styrene-based copolymer and the titanium dioxide are comprised at a weight ratio of 1:1 to 1:3.

6. The polycarbonate resin composition of claim 1, wherein the titanium dioxide has an average size of 0.1 to 0.3 μm and a rutile phase.

7. The polycarbonate resin composition of claim 6, wherein the titanium dioxide is surface-treated.

8. The polycarbonate resin composition of claim 1, wherein the mineral filler comprises one or more of talc, mica and wollastonite.

9. The polycarbonate resin composition of claim 8, wherein the mineral filler comprises the talc having an average size of 3 to 10 μm or the wollastonite having an average size of 5 to 30 μm.

10. The polycarbonate resin composition of claim 1, further comprising an additive in an amount of 0.01 to 5 wt % based on the total weight of the polycarbonate resin composition,
    wherein the additive comprises one or more of a thermal stabilizer, a lubricant and a light stabilizer.

11. The polycarbonate resin composition of claim 1, which has a light reflectance of 95% or more at a wavelength of 400 to 700 nm, and a light transmittance of 0% at a wavelength of 400 to 700 nm.

12. The polycarbonate resin composition of claim 1, which has a melt index of 10 to 16 g/10 min, as measured in accordance with standard ISO 1133 (at 260° C. under 5 kg), a notched impact strength of 34 kJ/m2 or more at room temperature (23° C.), as measured in accordance with standard ISO 179, and a heat distortion temperature (HDT) of 105° C. or higher as measured in accordance with standard ISO 75.

13. An automotive molded article produced using the polycarbonate resin composition of claim 1.

14. The automotive molded article of claim 13, wherein the automotive molded article is included in a button housing, a button holder, an inner panel, or a multi-terminal housing.

* * * * *